United States Patent [19]

Porter

[11] Patent Number: 4,457,406
[45] Date of Patent: Jul. 3, 1984

[54] IMPROVED FRICTION LOCK

[75] Inventor: Clyde R. Porter, Los Angeles, Calif.

[73] Assignee: P. L. Porter Company, Woodland Hills, Calif.

[21] Appl. No.: 267,852

[22] Filed: May 28, 1981

Related U.S. Application Data

[63] Continuation-in-part of Ser. No. 157,458, Jun. 6, 1980, abandoned.

[51] Int. Cl.³ ............................................. B65H 59/10
[52] U.S. Cl. .................................. 188/67; 188/77 W; 192/81 R; 297/375
[58] Field of Search ............. 188/67, 77 W, 265, 285, 188/196; 192/81 R, 81 C, 114 R; 74/531; 297/375; 267/155

[56] References Cited

U.S. PATENT DOCUMENTS

| | | | |
|---|---|---|---|
| 2,393,242 | 1/1946 | Flogaus | 188/67 X |
| 2,750,994 | 6/1956 | Howell, Jr. | 297/375 |
| 2,890,477 | 6/1959 | Miller | 267/155 X |
| 3,249,180 | 5/1966 | Torossian | 192/81 R X |
| 3,874,480 | 4/1975 | Porter et al. | 297/375 X |
| 3,998,302 | 12/1976 | Schupner | 188/285 |
| 4,099,777 | 7/1978 | Chekirda | 297/375 |
| 4,294,339 | 10/1981 | Granger et al. | 192/81 C X |

FOREIGN PATENT DOCUMENTS 2327847 1/1975 Fed. Rep. of Germany ...... 267/155

Primary Examiner—Douglas C. Butler
Attorney, Agent, or Firm—Beehler, Pavitt, Siegemund, Jagger & Martella

[57] ABSTRACT

A mechanical lock normally preventing axial motion of a rod with respect to a housing includes a coil spring which normally encircles and grips the rod tightly. The coil spring is mounted on the rod between a fixed bushing and a rotatable bushing. The two bushings are identical and interchangeable to reduce the cost and complexity of the device. The rotatable bushing is rotated by an actuating lever to unwind the spring so as to increase its diameter and thereby to release its grip on the rod. Both the fixed bushing and the rotatable bushing include beveled faces which permit the last few turns at both ends of the spring to become cocked on the rod to provide a true locking engagement with the rod. The last few turns of the spring adjacent the rotatable bushing are immediately released by a minimum of rotation of the bushing since it is not necessary for the unwinding of the spring to be transmitted through the entire length of the spring.

9 Claims, 8 Drawing Figures

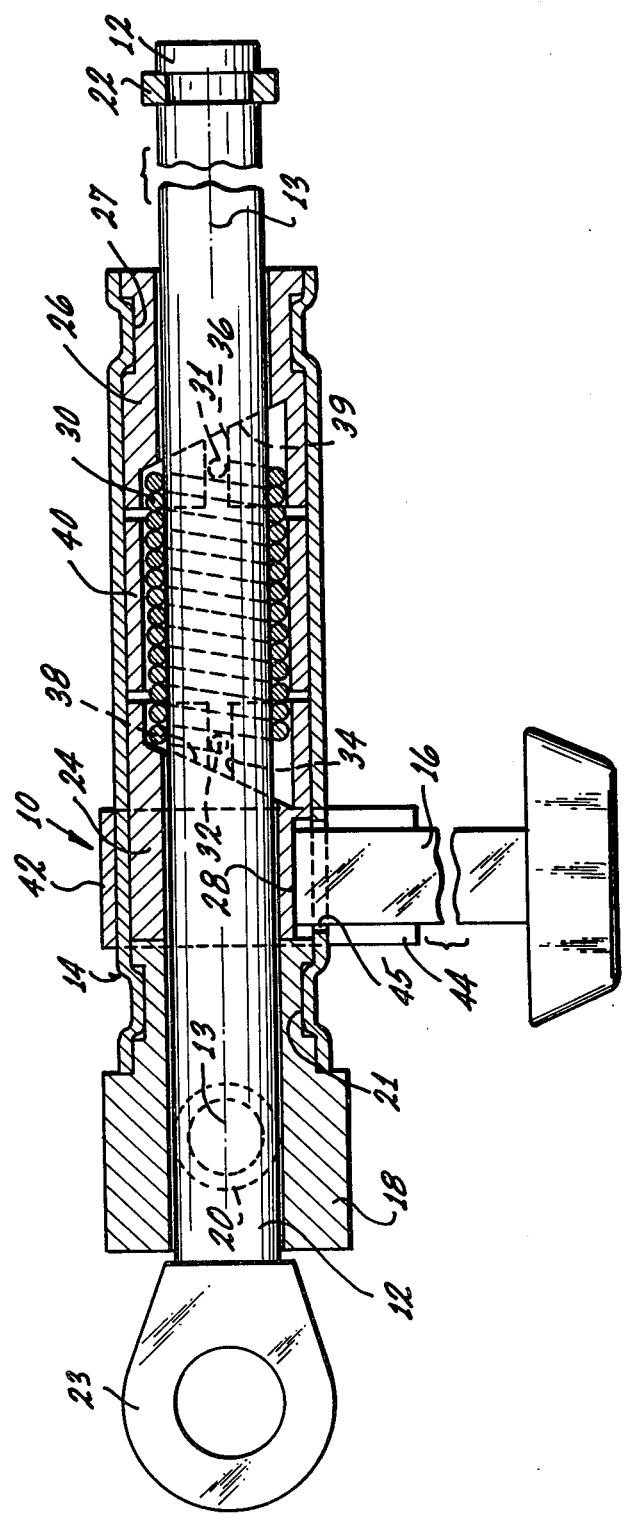

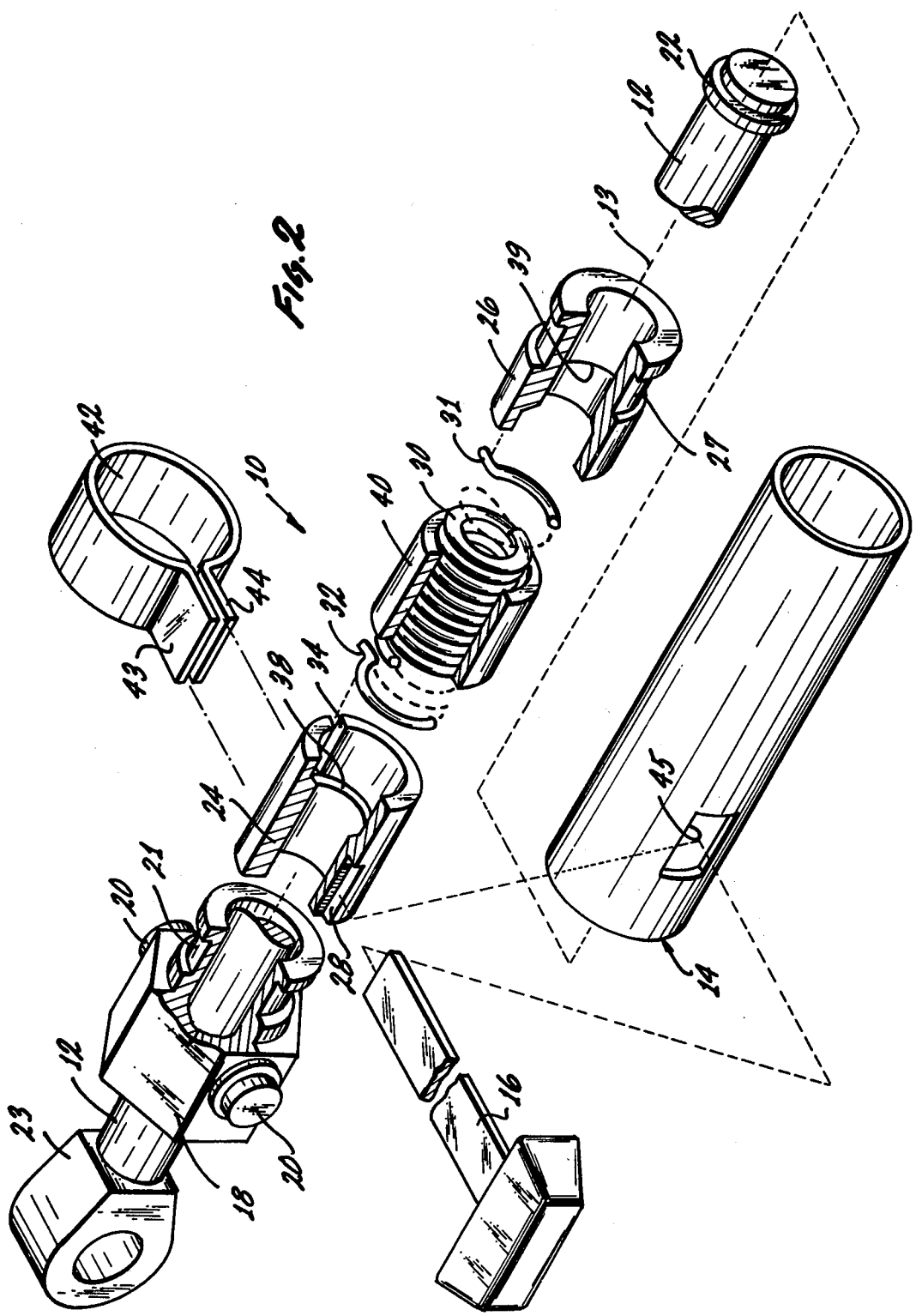

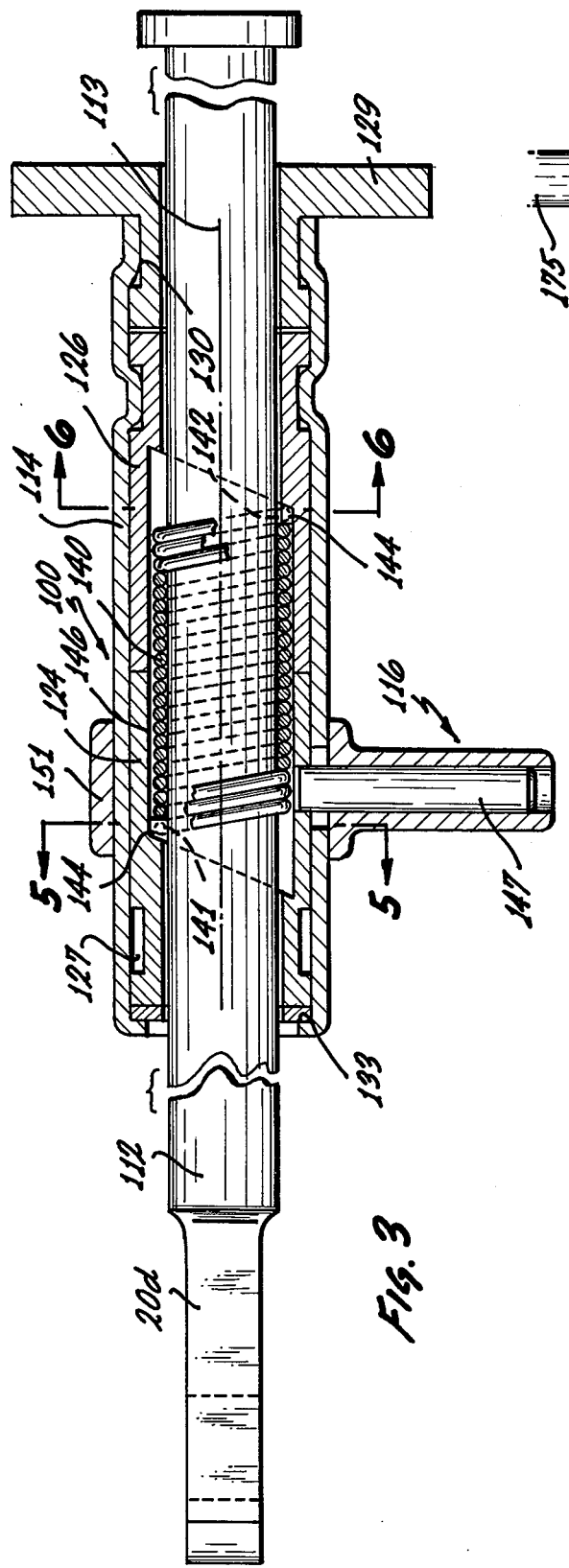

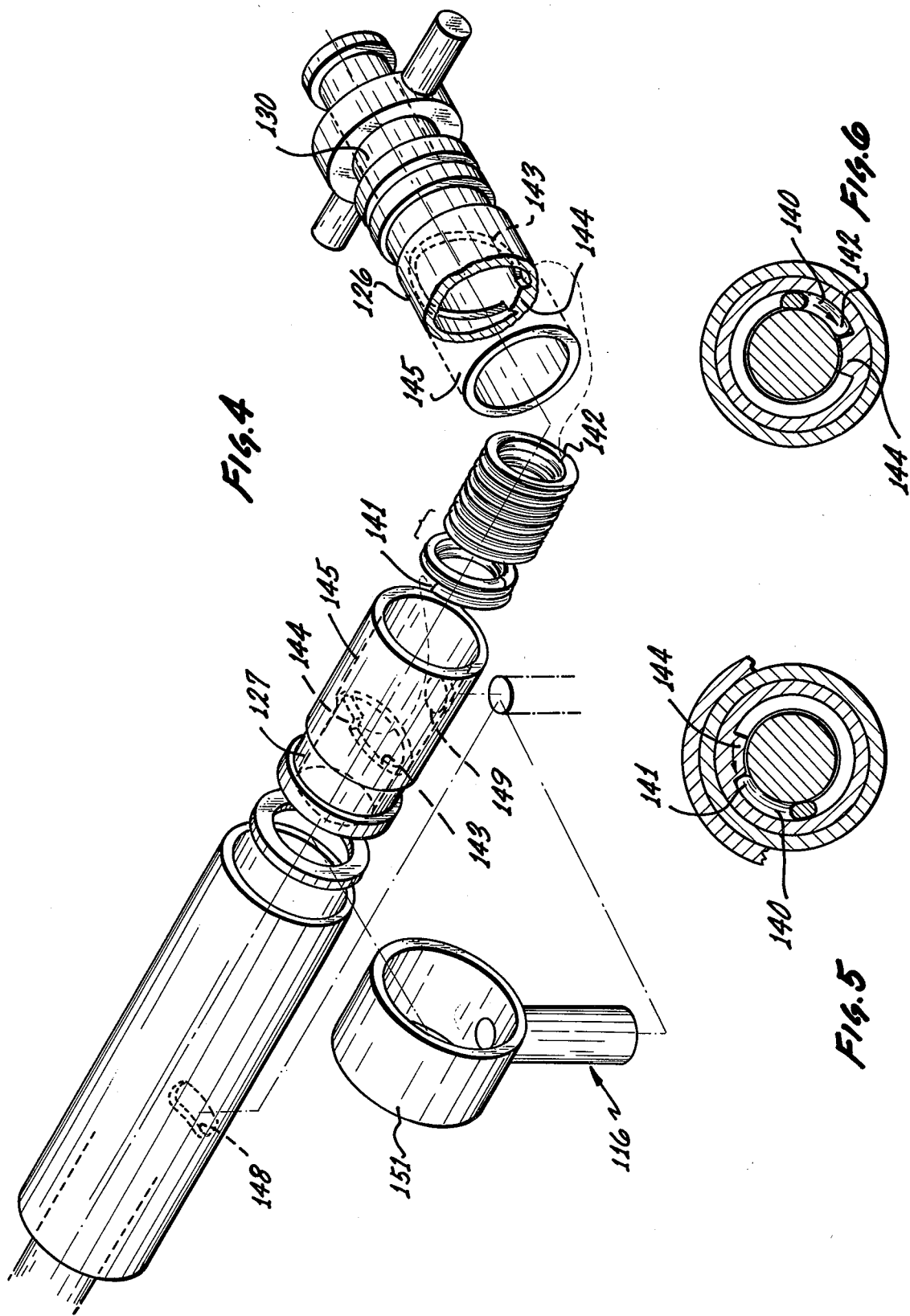

IMPROVED FRICTION LOCK

This application is a continuation-in-part of Application Ser. No. 157,458, filed June 6, 1980 now abandoned, and assigned to the same assignee.

BACKGROUND OF THE INVENTION

1. Field of the Invention

The present invention is in the field of mechanical locking devices and specifically relates to a device of the type in which the locking is effected by a coiled spring which grips a rod, for clamping the rod against translational motion relative to a housing and for selectively enabling such motion.

2. The Prior Art

Friction brake locking devices are known in which a rod extends into a cylindrical housing. Normally, the rod is locked with respect to the housing so that axial translational motion of the rod relative to the housing is prevented. However, the device can be selectively actuated to an unlocked state in which such motion is enabled. A coiled spring is affixed to the housing and is coaxial with the rod in the locked state. The spring grips the curved surface of the rod to prevent the rod from moving with respect to the housing. An actuation lever permits an operator to partially unwind the spring, thereby increasing its inside diameter so that the spring no longer grips the rod, which may then be moved freely axially within the coiled spring.

The use of a coiled spring to grip a rod extending coaxially through the spring is well known. A number of locking devices making use of this basic principle are known in the art.

Among the prior art devices is the locking device of U.S. Pat. No. 3,249,180 issued May 3, 1966 to Torossian. As shown in FIG. 10 of the Torossian patent, the spring is affixed at one end to a fixed ring 109, while the other end of the spring 108 is engaged by a rotatable ring 110. The ring 110 engages a longitudinally-extending groove in the rod, so that when the rod is rotated, the ring also rotates to tighten the grip of the spring on the rod.

The device of the Torossian patent includes an abutment on the rotating ring and on the fixed ring to cause the spring to become cocked on the rod, in which state the gripping force of the spring on the rod increases with the axial load, thereby resulting in a true locking action. This aspect of the mechanics of the device was also recognized by Howell in U.S. Pat. No. 2,750,996 issued June 10, 1956. However, as shown most clearly in FIG. 5 of the Howell patent, in his device only the fixed sleeve 25 is provided with a beveled base 40, and the device is actuated by rotating the opposite end 31 of the spring. Accordingly, in Howell's device it is necessary to unwind the many turns of the spring to transmit the enlargement of the diameter to the fixed end of the spring. This necessitates an unnecessarily long stroke for the actuating lever.

Another type of prior art device is that shown in U.S. Pat. No. 3,874,480 issued Apr. 1, 1975 to Porter et al. As can best be seen in FIG. 2 of the Porter et al. patent, two springs are disposed coaxially to extend in opposite directions from a central actuating lever to fixed locking bushings located at opposite ends of a housing sleeve. One of the locking bushings locks the device in tension and the other locks it in compression. The interaction of the last two or three coils at the ends of the springs distal to the actuating lever with the locking bushings is responsible for the locking effect.

It is noteworthy that while only one of the springs in the Porter et al. device is effective at a particular instant to oppose tension or compression, unlocking of the device nonetheless requires unwinding both springs simultaneously by use of the actuating lever. The lever must be moved through a sufficient stroke that the entire length of each spring is unwound, to ensure that the last two or three turns will be unwound. This necessitates a large actuating lever stroke which is opposed by the combined forces of both springs resisting unwinding. Consequently, in contrast to the present invention, both the actuating lever stroke and the force needed for its operation are relatively large. While such structure functions well, there are installations where, due to space limitations and the like, there is a need for a friction brake type of device in which the stroke of the actuating lever is comparatively small and which operates at a comparatively smaller force.

The structure of the Porter et al. device, while satisfactory in performance, is somewhat complicated because of the assembly of the device. The end bushings which affixed the distal ends of the springs to the housing sleeve had to be rotated during the assembly process to positions in which the proximal ends of both of the springs abutted the actuating lever in a balanced manner. Such rotation necessitated that the grip of at least one of the springs be released by unwinding that spring. In practice, assembly required a highly-skilled wind-up operation to assure that both springs were properly compacted and twisted against the actuating lever. In contrast, in the present invention this complicated assembly procedure is not required.

The following patents can be distinguished from the present invention on the basis that they do not include an abutment or beveled bushing against which the spring bears, and accordingly the true locking action discussed above is not employed. These patents include U.S. Pat. No. 2,434,480 to Anderson issued Jan. 12, 1948; U.S. Pat. No. 3,320,595 to Kedem; U.S. Pat. No. 2,429,383 to Arens, and U.S. Pat. No. 3,064,766 to Hanizeski.

There are instances in which it is desirable to have a mechanical locking device in which the force needed to release the lock mechanism is reduced while also reducing the amount of movement of the actuating lever to effect release. A typical such application is in the automotive seat field in which movement of the seat back between an upright and reclining position should be accomplished smoothly and without a snap type action. Further, where the locking mechanism is of the direct control actuation type, i.e., the user manipulates a release lever, in contrast to some type of linkage mechanism of the remote control type, large forces for release or large movements of the actuating lever should be avoided.

While the above may be accomplished, one of the practical considerations is to accomplish these objectives with a relatively inexpensive device, but one which is capable of functioning properly over an extended period of time. Further, the device should be essentially maintenance free and capable of functioning over extreme temperature ranges and not adversely affected by water, dirt, dust and the like.

SUMMARY OF THE INVENTION

In accordance with the present invention, the above-described disadvantages of the prior art mechanical locks are overcome by the improved structure to be described and which represents a preferred form of the invention. This structure of the invention includes only a single spring instead of the two springs used in the Porter et al. patent, thereby immediately reducing the actuating force by half.

In accordance with the present invention, a stationary locking bushing is provided at one end of the single spring and a rotatable locking bushing is provided at the other end of the spring. The spring interacts with these locking bushings to prevent motion of the rod in either axial direction. The rotatable locking bushing is turned by an actuating lever, and since the last two or three coils of the spring that are effective for locking the rod in one direction are adjacent the rotatable locking bushing, it is not necessary to unwind the entire spring to release the grip of those coils. Thus, the release action is smooth because the balance of the spring tends to act as a drag, thereby avoiding a snap release action and the sudden motion which normally accompanies a snap action release. Accordingly, these coils can be released by only a short stroke of the actuating lever. Thus, the present invention makes possible a mechanical lock that requires less force and less stroke to release while assuring a smooth release. These features make practical the use of a direct control actuation push-button type of control for operating the actuating lever. The use of a push-button control is very desirable from an aesthetic or styling standpoint.

A further feature is the location of the actuating lever in a position other than in the area of the spring. The opening through which the lever extends is covered to prevent intrusion of dirt, soap or cleaning solutions, especially in the area of the locking zone between the few coils of the spring and the rod. The interior of the device is packed with a high temperature range grease of the aircraft or automotive type, and which is a type which does not flow at high temperature.

Less apparent, but also important, is the simplification of the assembly process that results from the structure of the present invention. Unlike the mechanical lock described in the Porter et al. patent, the parts of the present invention can be assembled along the rod, inserted into the housing sleeve, and then affixed to the housing sleeve by swaging the fixed locking bushing inside the sleeve.

Because the spring in the present invention is shorter than the springs used in the device described in the Porter et al. patent, the entire mechanical lock is shorter. The length-to-diameter ratio is correspondingly less, and this improves the ability of the device to resist bending while allowing higher unit loading because of the shorter column length.

Because the entire mechanical lock is shorter and because its assembly procedure is simpler, the mechanical lock of the present invention can be produced at a cost that is approximately half that of the prior art mechanical lock. The mechanical lock of the present invention is appreciably lighter in weight than the prior art lock, which makes the lock of the present invention better suited for aircraft and automotive use.

In one form of this invention, the bushings are constructed to include an inner annular inclined cam surface including a cam stop at the apex thereof for cooperation with the adjacent end of the spring which abuts the cam stop. In this form, the spring includes plain ends which provide a flat surface positioned on the radius of the center line of the spring and for abutment against the stop. Further, the bushings may be of the same structure without the need for a separate sleeve. The various modifications of this form will be described.

It will be understood, however, that one of the principal advantages of this invention, in the various forms described, is ease of manufacture and assembly to provide an infinitely positionable lock which is effective as a low-cost friction lock mechanism.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a view, partly in section and partly in elevation, showing a preferred embodiment of the mechanical lock of the present invention;

FIG. 2 is an exploded view, with some parts in section, of the mechanical lock shown in FIG. 1;

FIG. 3 is a view of FIG. 4, partly in section and partly in elevation, of another preferred embodiment of this invention;

FIG. 4 is an exploded view, oriented to illustrate the interior of the bushings and the relationship thereof to the remaining components of the structure;

FIG. 5 is a sectional view, taken along the line 5—5 of FIG. 3;

FIG. 6 is a sectional view, taken along the line 6—6 of FIG. 3;

FIG. 7 is a view in section of a form of the present invention having a rotatable actuator; and, FIG. 8 is a perspective view of another form of the present invention in which a sleeve is used and wherein the actuator may be mounted on the sleeve or bushing.

DETAILED DESCRIPTION OF THE PREFERRED EMBODIMENT

Turning now to the drawings, in which there is shown a preferred embodiment of the present invention, it can be seen that the mechanical lock 10 includes cylindrical rod 12 which is selectively slideable along an axis 13 within and relative to a housing 14 which may be tubular, as shown.

Normally, the rod 12 is locked at a fixed position axially with respect to the housing 14; and this relationship is interrupted only when an operator moves an actuating lever 16 to unlock the device to permit the rod 12 to be shifted axially to a new position with respect to the housing 14.

The mechanical friction lock 10 shown in the drawings may be used in positioning the back of a seat of the reclining type commonly used in passenger airplanes, railroad coaches and automobiles. The mechanical lock is provided with a mounting 18 and a trunnion 20 for use in attaching the mechanical lock to certain portions of the seat. The portion of the mounting received within one end of the housing 14 includes a groove 21 which is used to swage the housing to the mounting, as shown. A stop 22 provides a positive limit to the amount of motion of the rod 12 with respect to the housing 14, the other end of the rod may include an eye 23 or any other form of device for attachment to a cooperating component of the seat.

Located axially of the rod, within the housing and adjacent to the mounting 18 is a rotatable bushing 24 while at the other end of the housing is a second bushing 26 which includes a groove 27, similar to 21, used to swage the housing 14 to the fixed bushing 26. Rotatable bushing 24 may include a groove 28 provided along the outer periphery to receive the end of the lever as shown.

Surrounding a portion of the rod and located between the rotatable and fixed bushings 24 and 26, respectively, is a helical coil spring 30, each end of which includes a radially extending tang 31 and 32. Bushing 24 includes an axial slot 34 to receive tang 32 while fixed bushing 26 includes an axial slot 36 to receive the other tang 31. Thus, one end of the spring is fixed against rotation while the other end may be rotated.

In the normal at-rest seat position of the lever 16, the spring 30 is in frictional engagement with the periphery with the rod 12 to lock the rod in a fixed position axially with the housing 14. Upon movement of the actuating lever 16, the rotatable bushing is rotated and the spring 30 is unwound, causing it to release its grip on the rod 12. Depending upon the direction in which the spring 30 is wound, release movement of the lever 16 may be up or down, as viewed in the drawings, to rotate bushing 24 in one or the other direction to effect release of the rod 12. When released, the lever 16 returns automatically to the locked position and the spring frictionally engages the periphery of the rod 14.

The rotating bushing 24 includes a beveled face 38, and the fixed bushing 26 includes a beveled face 39. These beveled faces cause the last few coils at the ends of the spring 30 to become cocked against the rod 12 thereby locking it with a true locking action in tension and compression respectively. The locking engagement referred to herein is a type of interaction in which the application of increased force results in the parts becoming more securely locked together.

A sleeve 40 may surround the spring 30 to insure that as the spring is unwound by motion of the rotatable bushings 24 the slack of the spring will be transmitted to the end of the spring held by the fixed bushing 26 rather than being accumulated in the turns nearest the rotatable bushing 24. While the form illustrated includes a sleeve 40, one variant which may be used is to increase the axial length of each of the bushings 24 and 26 so that the respective inboard ends or skirts of the bushings meet. In this way the sleeve 30 is not needed since the extended bushings now perform the function of that sleeve. One advantage of this variant is that better bend resistance is provided along the axis of the housing.

In the form illustrated, a collar 42 with two spaced fingers 43 and 44 fits over the housing 14. The fingers 43 and 44 may be affixed to the lever 16, as by welding or the like, so that as the lever is actuated, the collar 42 rotates relative to the housing 14.

The housing 14 includes a window 45 through which the lever 16 extends into slot 28 of the bushing 24. Since the collar 42 moves with the lever, it functions as a cover for the window to prevent dust and other foreign materials from entering the housing through window 45.

As mentioned earlier, the inside of the housing between the end mounting 18 and bushing 26 is packed with lubricant such as a high temperature stable grease which will not flow at elevated temperatures. Thus, one function of the collar 42 is to assist keeping the grease within the housing.

It will also be noted that the window 45 is located in alignment with the slot 28 of the bushing 24, rather than in an area opening into the spring region. As a practical matter, it is quite difficult for foreign matter to enter the housing through the window and to move between the outer periphery of bushing 24 and the facing inside wall of the housing into the locking region of the spring. This has definite practical advantages over prior art structure, especially for locking devices used in the automotive field.

In operation, only a relative small amount of movement of the lever 16 is needed in order to effect release of the rod 12, as is apparent from the relatively small circumferential size of the window 45. Further, since one spring is used, fixed at one end and moveable at the other, the amount of force needed is reduced. The reduction in force is also attributable to the fact that the effective locking coils of the spring 30 are those first two or three coils adjacent to the rotating bushing 24. To achieve this type of locking, the bushings include the angular faces 38 and 39 which produce the action described. The result is that there tends to be an immediate and progressive release by a small amount of rotation of the bushings 24, i.e., it is not necessary to transmit the motion throughout the entire length of the spring 30. The action is that of a gradual type release as the first few coils of the spring unwind, with the balance of the spring acting as a drag for smooth release of the rod 12. In practical terms, the elimination of the initial, snap quick release, with the resulting sudden motion, is of definite advantage.

The structure of the present invention as shown in the drawings simplifies the assembly of the mechanical lock. The fixed bushing 26, the rotatable bushing 24, the spring 30, the sleeve 40, and finally, the fixed bushing are slid onto the rod in succession, the rotatable bushing 24 and the fixed bushing 26 being rotated until the tangs 21, 42 of the spring 30 enter the slots 36, 34. Thereafter, the housing 14 is slid over the other parts on the rod and swaged to the end mounting 18 and the fixed bushing 26. Thereafter, the actuator 16, and the stop 22 and collar 42 are affixed to the mechanism. During the assembly, grease is also introduced into the assembly, but prior to the assembly of the collar.

In the form of the infinitely positionable mechanical lock illustrated in FIGS. 3 and 4, the components have been fabricated to reduce the cost of the overall assembly both by reducing the number of components and simplifying both their structure and the assembly thereof. The mechanical lock 100 includes a cylindrical rod 112 slidable along an axis 113, relative to a housing 114, as previously described. The rod is normally locked relative to the housing 114, as described, but may be released by movement of the actuating lever 116, also as previously described.

In the form illustrated in FIGS. 3 and 4, the rotatable bushing 124 and the fixed bushing 126 are of essentially the same identical structure. Thus, referring to rotatable bushing 124, the outer surface is provided with a swaging groove 127 which is not used in the rotatable bushing, but which is used in the fixed bushing 126 to secure the latter to the housing 114, as shown.

At the other end of the housing 114 a washer 133 is positioned between the end of the rotatable bushing and the end of the housing which is formed over the washer, as illustrated.

Positioned between the bushings 124 and 126, and surrounding the rod 112 is a helical spring 140 (see FIG. 4) whose ends 141 and 142 are plain flat ends forming flat faces located on the radius of the center line of the spring. Each bushing includes an interior inclined cam surface 143 and a cam stop 144 with the portion 145 of the bushing extending beyond the surface and stop, being dimensionally somewhat larger in diameter to form a spring space 146 between the portion 145 of the bushings and the outside surface of the rod. The spring 140 is positioned in the spring space 146 with the ends 141 and 142 abutting the corresponding stops 144.

The cam surfaces of the bushings cause the last few coils of each end of the spring to become locked against the rod, thus locking the rod relative to the housing in a true locking action both in tension and compression. The locking action is as previously described.

Cooperating with the rotatable bushing 124 is an actuating assembly, including the lever 116 and a pin 147 which passes through an enlarged slot 148 in the housing and through an aperture 149 in the rotatable bushing. Surrounding the housing and cooperating with the pin is a collar 151, the pin being driven through the lever 116 for an interference fit with the aperture 149. Optionally, the pin 147 may be welded to the bushing, as will be described.

Operation on the lock of FIGS. 3-6 is as already described, i.e., a small amount of rotation of the lever causes a small amount of rotation of the bushing 124 and the stop 144 acting on the end face 131 of the spring operates to uncoil the spring to release the rod, as already described.

In some instances, due to installation or requirement of the user, the actuator may be made part of the rotatable bushings, as illustrated in FIG. 7. There the rotatable bushing includes an axial extension 160 which surrounds the rod and extends beyond the end of the housing 114. A slot 163 is formed, as shown, to permit the housing to be formed over a shoulder 164 formed at the end of the bushing. Rotation of the extension effects rotation of the bushing to effect release, as described. In this form, for example, the extension may be a gear so that a motor or other device can be coupled to effect release.

In the form shown in FIG. 8, a sleeve 170 is positioned between the bushings, the rotatable bushing being shown. In the form illustrated, the rotatable bushing 171 is of the structure described in connection with FIG. 3 except that the end of the bushing includes a pair of fingers 173 which are received in finger slots 174 provided in each end of the sleeve so that the sleeve may be installed without concern for orientation. In this form, the fixed bushing is the same as the rotatable bushing but does not include the fingers but does include a swaging groove.

The actuator 175 for the lock, in this form, may be welded directly to the bushing 171 or to the sleeve, and offers the option of being able to locate the pin at various locations along the length of the lock as may be required for various installations. Where the pin is welded to either the bushing of the sleeve, the collar 151 is not necessary, although the slot in the housing is needed. As mentioned, pin 147 (FIG. 3) may be welded to the rotatable bushing. Where welded, the structure offers strength and ease of assembly. For example, the pin may be inserted through the housing aperture in contact with the rotatable bushing and then welded in place. Thereafter, the remaining components are assembled and fixed in position.

Thus, there has been described a mechanical friction lock having a structure which permits the lock to be unlocked by use of an actuating lever in which the stroke and the actuating force are significantly reduced in comparison with mechanical locks of the prior art. The device uses a rotatable locking bushing that is turned by the actuating lever and because the two or three coils of the spring that are effective for locking the rod in one direction are adjacent the rotatable locking bushing, it is not necessary to unwind the entire spring to release the grip of those coils to permit motion in that direction. The reduced stroke and actuating force of the mechanical lock of the present invention make practical the use of a direct control push-button actuation for operating the lever. The use of a push-button control is very desirable from a styling standpoint. The assembly process is simplified by the structure of the lock of the present invention, and this, along with the reduced length of the devices makes it possible to manufacture the present invention at a cost approximately half that of prior art devices. Further, the advantageous length-to-diameter ratio of the present invention enhances the ability of the device to resist bending. Because the mechanical lock of the present invention is appreciably lighter in weight than prior art locks, it is better suited for aircraft and automotive use.

The foregoing detailed description is illustrative of one embodiment of the invention, and it is to be understood that additional embodiments thereof will be obvious to those skilled in the art. The embodiments described herein, together with those additional embodiments are considered to be within the scope of the invention.

What is claimed is:

1. As an article of manufacture, an infinitely positionable mechanical friction lock comprising:
 a housing having a rod positioned therein for axial movement with respect thereto;
 first and second substantially identical interchangeable bushings each including an inner annular inclined cam surface and a cam stop, one bushing being fixed to said housing and the other bushing being rotatable relative to said housing;
 a coil spring positioned on said rod and located within said spring space between said inclined cam surfaces and normally operative to grip said rod to prevent movement thereof relative to said housing;
 said coil spring including ends providing a flat surface on the radius of the center line of said spring for abutting engagement with the cam stop of said bushings; and,
 actuator means to effect rotation of said rotatable bushing whereby said coil spring is released from said rod to permit movement of the latter relative to said housing, said actuator means being engageable with said rotatable bushing through an opening defined in said housing.

2. An article of manufacture as set forth in claim 1 wherein one end of said fixed bushing abuts the one end of said rotatable bushing.

3. An article of manufacture as set forth in claim 1 wherein said portions of said bushings define a sleeve between said bushings and surrounding at least a portion of said coil spring.

4. An article of manufacture as set forth in claim 1 wherein said actuator means includes a collar rotatable about said housing and connected to said rotatable bushing by a pin extending through aligned openings in said collar, said housing and said bushing.

5. An article of manufacture as set forth in claim 1 wherein said actuator is an axial extension of said rotatable bushing.

6. An article of manufacture as set forth in claim 1 wherein said actuator is a radial member welded to said rotatable bushing.

7. An article of manufacture as set forth in claim 1 wherein each said bushing includes a swaging groove for securing said fixed bushing to said housing.

8. An article of manufacture as set forth in claim 1 wherein each said bushing has defined therein a pin receiving aperture for attaching said actuator means to said rotatable bushing.

9. As an article of manufacture, an infinitely positionable mechanical friction lock comprising:
 a housing having a rod positioned therein for axially movement with respect thereto;
 first and second substantially identical interchangeable bushings, each bushing including an inner annular inclined cam surface, a cam stop, a swaging groove, a pin receiving opening, and portions defining a spring space, one bushing being swaged to said housing, the other bushing being rotatable relative to said housing;
 a coil spring positioned on said rod and located within said spring space between said inclined cam surfaces, said spring being normally operative to grip said rod to prevent movement thereof relative to said housing;
 said coil spring including ends providing a flat surface on the radius of the center line of said spring for abutting engagement with the cam stop of said bushings; and
 actuator means to effect rotation of said rotatable bushing whereby said coil spring is released from said rod to permit movement of the latter relative to said housing, said actuator means including a collar rotatable about said housing and retaining pin means extending through an opening defined in said housing for affixing said collar to said rotatable bushing.

* * * * *